(12) United States Patent
Brunton et al.

(10) Patent No.: US 10,882,136 B2
(45) Date of Patent: Jan. 5, 2021

(54) METHOD AND APPARATUS FOR FORMING A CONDUCTIVE TRACK

(71) Applicant: M-SOLV LTD., Oxford (GB)

(72) Inventors: Adam North Brunton, Oxford (GB); Simon John Henley, London (GB)

(73) Assignee: M-SOLV LTD., Oxford (GB)

( * ) Notice: Subject to any disclaimer, the term of this patent is extended or adjusted under 35 U.S.C. 154(b) by 347 days.

(21) Appl. No.: 15/753,265

(22) PCT Filed: Aug. 3, 2016

(86) PCT No.: PCT/GB2016/052387
§ 371 (c)(1),
(2) Date: Feb. 17, 2018

(87) PCT Pub. No.: WO2017/029472
PCT Pub. Date: Feb. 23, 2017

(65) Prior Publication Data
US 2018/0236601 A1 Aug. 23, 2018

(30) Foreign Application Priority Data
Aug. 18, 2015 (GB) .................................. 1514655.8

(51) Int. Cl.
B23K 26/073 (2006.01)
B23K 26/34 (2014.01)
(Continued)

(52) U.S. Cl.
CPC ........ *B23K 26/0732* (2013.01); *B23K 26/066* (2015.10); *B23K 26/34* (2013.01); *G02B 27/0927* (2013.01)

(58) Field of Classification Search
CPC .. B23K 26/0732; B23K 26/066; B23K 26/34; G02B 27/0927
(Continued)

(56) References Cited

U.S. PATENT DOCUMENTS 6,168,968 B1 1/2001 Umemoto et al.
6,331,692 B1 12/2001 Krause et al.
(Continued)

FOREIGN PATENT DOCUMENTS

EP 1055479 A2 11/2000
GB 2220502 A 1/1990
(Continued)

OTHER PUBLICATIONS

International Search Report for PCT/GB2016/052387, ISA/EP, Rijswijk, NL, dated Oct. 18, 2016.
(Continued)

*Primary Examiner* — Jennifer C Chiang
(74) *Attorney, Agent, or Firm* — Harness, Dickey & Pierce, P.L.C.

(57) ABSTRACT

A method for forming a conductive track on a surface (21) of a substrate (11) that includes providing the substrate (11), wherein the substrate (11) comprises deposited material (23) along a path on a surface (21) of the substrate (11). Generating a laser beam having an optical axis and an energy distribution within a cross-sectional area of the laser beam incident on the surface (21). The energy distribution of the laser beam is non-circularly symmetric about the optical axis at the surface (21). The method further includes directing the laser beam to move along the path to irradiate the deposited material (23) to provide a conductive track along the path. A selected orientation of the energy distribution within the cross-sectional area is aligned with the direction of movement of the laser beam.

24 Claims, 6 Drawing Sheets

(51) Int. Cl.
*B23K 26/066* (2014.01)
*G02B 27/09* (2006.01)

(58) Field of Classification Search
USPC .................................................. 219/121.74
See application file for complete search history.

(56) References Cited

U.S. PATENT DOCUMENTS

| | | | |
|---|---|---|---|
| 6,961,361 | B1 | 11/2005 | Tanaka |
| 7,722,422 | B2 | 5/2010 | Cok |
| 8,445,775 | B2 * | 5/2013 | Shinohara ....... H01L 31/022425 136/244 |
| 2003/0080099 | A1 | 5/2003 | Tanaka et al. |
| 2006/0003262 | A1 | 1/2006 | Yang et al. |
| 2006/0057502 | A1 | 3/2006 | Okada et al. |
| 2011/0266264 | A1 | 11/2011 | Rumsby |
| 2012/0015112 | A1 | 1/2012 | Yang et al. |

FOREIGN PATENT DOCUMENTS

| | | |
|---|---|---|
| JP | H04-307727 A | 10/1992 |
| JP | 2006032916 A | 2/2006 |
| JP | 2010145562 A | 7/2010 |
| JP | 2011194413 A | 10/2011 |
| KR | 20100080120 A | 7/2010 |
| KR | 20130023732 A | 3/2013 |
| WO | WO-2004020140 A1 | 3/2004 |
| WO | WO-2006011671 A1 | 2/2006 |
| WO | WO-2011-048352 A1 | 4/2011 |
| WO | WO-2016075822 A1 | 5/2016 |

OTHER PUBLICATIONS

Written Opinion of the ISA for PCT/GB2016/052387, ISA/EP, Rijswijk, NL, dated Oct. 18, 2016.
Search Report regarding Great Britain Patent Application No. 1514655.8, dated Jun. 24, 2016.

* cited by examiner

METHOD AND APPARATUS FOR FORMING A CONDUCTIVE TRACK

CROSS-REFERENCE TO RELATED APPLICATIONS

This application is a 371 U.S. National Stage of International Application No. PCT/GB2016/052387, filed Aug. 3, 2016. This application claims the benefit of and priority to British Patent Application No. 1514655.8, filed Aug. 18, 2015. The disclosures of the above applications are incorporated herein by reference.

TECHNICAL FIELD

This invention relates to a process for forming a conductive track. In particular, it describes a method using a laser beam to irradiate deposited material in a path to form a conductive track. The invention also relates to an apparatus for carrying out the method described.

BACKGROUND ART

There are known methods of irradiating deposited material in a path to form a conductive track.

U.S. Pat. No. 7,722,422 B2 discloses a method in which a patterned protective layer is formed on an electrode, the patterned protective layer having open areas where the protective layer is not present. A solution including electrically conductive components is formed in the open areas. Once deposited, the solution comprising electrically conductive components is dried, then cured by employing a laser having a directed laser beam. The directed laser beam can sinter dried electrically conductive precursor materials to form a cured solution providing increased electrical conductivity in the open areas of the patterned protective layer.

The process described in U.S. Pat. No. 7,722,422 B2 requires accurate resolution of the laser beam to ensure that the laser beam is directed at the deposited particles correctly.

There remains a requirement for more accurately irradiating deposited material on a surface of the substrate to provide a conductive track and/or more efficiently irradiating the deposited material on the surface of a substrate. In order to improve the efficiency of the manufacturing process and to help minimise thermal damage, it is beneficial to irradiate the material as quickly as possible to form the conductive tracks. There remains a need for a process capable of reliably forming conductive tracks at high speeds whilst minimising thermal damage.

The present invention provides a method of forming a conductive track which addresses the above mentioned problems with the prior art and has further advantages as described in detail below. Additionally, the present invention provides an apparatus for carrying out the method.

SUMMARY OF THE INVENTION

According to an aspect of the invention, there is provided a method for forming a conductive track on a surface of a substrate, the method comprising: providing a substrate, wherein the substrate comprises deposited material along a path on a surface of the substrate; generating a laser beam having an optical axis and an energy distribution across a cross-sectional area of the laser beam incident on the surface, the energy distribution being non-circularly symmetric about the optical axis at the surface; and directing the laser beam to move along said path to irradiate the deposited material to provide a conductive track along said path, wherein a selected orientation of the energy distribution across the cross-sectional area is aligned with the direction of movement of the laser beam, wherein the path is formed in a predefined pattern on top surface of the substrate, the path comprising straight portions extending in different directions and/or curved portions and wherein the laser beam is arranged to follow the straight and/or curved portions of the path and wherein the energy distribution of the laser beam within the cross-sectional area is a rotated about the optical axis relative to the substrate so as to maintain alignment between the selected orientation and the direction of movement.

According to a further aspect of the invention, there is provided an apparatus for forming a conductive track on a surface of a substrate, the apparatus comprising: a support for supporting a substrate, wherein the substrate comprises deposited material along a path on a surface of the substrate; a laser beam source configured to provide a laser beam having an optical axis and an energy distribution across a cross-sectional area of the laser beam incident on the surface, the energy distribution being non-circularly symmetric about the optical axis at the surface; and directing means configured to direct the laser beam to move along said path to irradiate the deposited material to provide a conductive track along said path, wherein a selected orientation of the energy distribution across the cross-sectional area is aligned with the direction of movement of the laser beam, wherein the path is formed in a predefined pattern on the surface of the substrate, the path comprising straight portions extending in different directions and/or curved portions and wherein the laser beam is arranged to follow the straight and/or curved portions of the path and wherein the directing means are configureed to rotate the energy distribution of the laser beam within the cross-sectional area about the optical axis relative to the substrate so as to maintain alignment between the selected orientation and direction of movement.

Other preferred and optional features of the invention will be apparent from the following description and the subsidiary claims of the specification.

BRIEF DESCRIPTION OF DRAWINGS

The invention will now be described, merely by way of example, with reference to the accompanying drawings, in which.

DETAILED DESCRIPTION OF THE DRAWINGS

Figure 1:
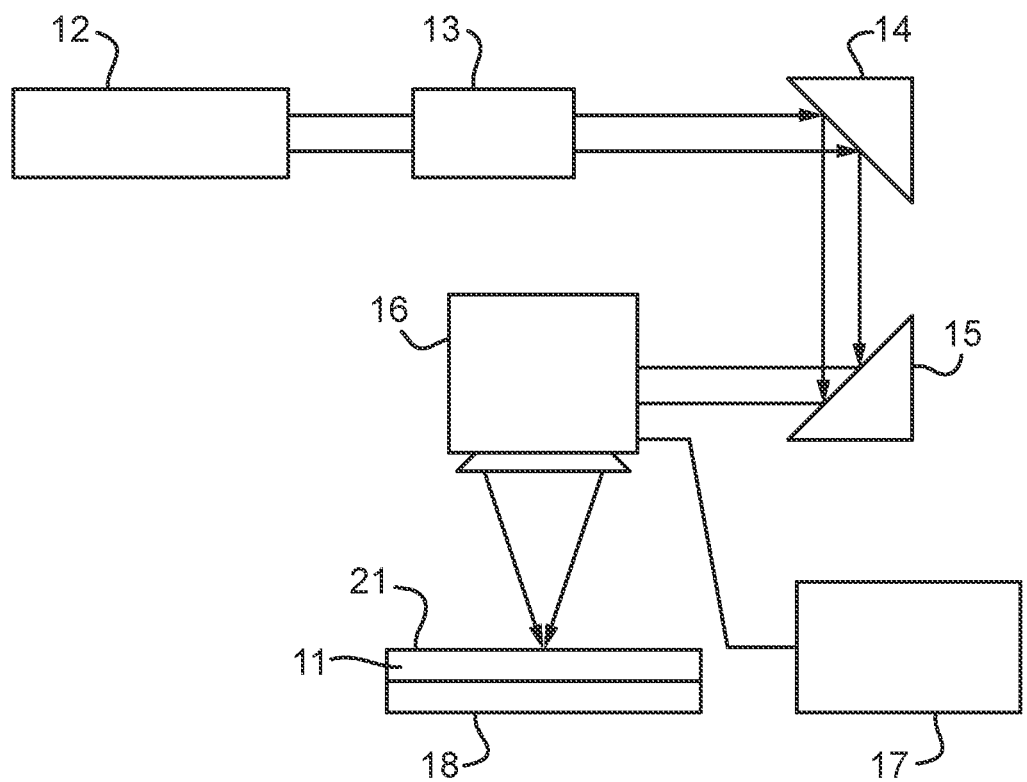
FIG. 1 shows an exemplary apparatus according to an aspect of the invention for carrying out a method according to a further aspect of the invention.

FIG. 1 depicts an exemplary apparatus according to an aspect of the invention for use in carrying out a method according to a further aspect of the invention. The method of the present invention provides a process for forming a conductive track. The method uses a laser beam to irradiate deposited material to form the conductive track.

The method comprises providing a substrate 11, wherein the substrate 11 comprises deposited material 23 in a path on a surface 21 of the substrate 11. In other words, the deposited material 23 is only on certain portions of the substrate 11. The deposited material 23 is provided along a path on the surface 21 of the substrate 11, i.e. to form a path of material at at least one desired location on the surface of the substrate.

A laser beam is generated from a laser 12, for example, a $CO_2$ laser, a diode-pumped solid state laser, a fibre laser or a laser diode. The laser 12 may be configured to provide a continuous wave laser beam, or a quasi-continuous wave laser beam. Alternatively, the laser 12 may be configured to provide a pulsed laser beam. The laser 12 preferably provides a laser beam with a wavelength of approximately 500 nm to 11 μm or preferably 500-1100 nm.

The laser beam is directed such that it is incident on the surface of the substrate 11. The laser beam may be directed to the surface of the substrate 11 using directing means. More specifically, the laser beam may be directed such that it is incident upon the deposited material 23 on the surface 21 of the substrate. As depicted in FIG. 1, the directing means may optionally comprise a beam expander 13, a first mirror 14, a second mirror 15, a galvanometer scanner 16, and/or a controller 17.

The beam expander 13 may be used to increase the diameter of the laser beam, ideally, whilst keeping the laser beam collimated. The first mirror 14 and the second mirror 15 are each used to reflect and redirect the laser beam towards the galvanometer scanner 16. The galvanometer scanner 16 may comprise optical elements, such as further mirrors, and a positioning device for moving the optical elements to accurately direct (i.e. steer) the laser beam to the desired location on the substrate 11 and scans over the substrate 11 as required. The galvanometer scanner 16 could be replaced with another type of scanner, for example, a two-dimensional acousto-optic beam deflector. The movement of the laser beam may be controlled by the galvanometer scanner 16. The controller 17 may be used to control the movement of the laser beam to accurately direct the laser beam to a desired location on the substrate 11 and to scan accurately the laser beam across the substrate 11. In other words, the controller 17 controls the steering and directing of the laser beam. For example, the controller 17 may control the galvanometer scanner 16, or its equivalent. Directing the laser beam in this way means that the deposited material 23 along the path on the surface of the substrate can be accurately irradiated.

The first mirror 14 and/or the second mirror 15 may be controlled by the controller 17 to direct the beam. The first mirror 14 and/or the second mirror 15 may be replaced with a device configured to actively shape the beam, e.g. at least one of the mirrors may be replaced with a spatial light modulator, which may optionally be controlled by the controller 17 to shape and/or direct the beam.

In FIG. 1, the substrate 11 may be provided comprising the deposited material 23. The deposited material 23 on the surface of the substrate 11 may be provided at any time prior to a laser beam being used to irradiate the deposited material 23. The substrate 11 may already comprise the deposited material 23, or the method may further comprise the step of depositing the material onto the substrate. The deposited material 23 may form a path on the surface of the substrate 11.

An apparatus according to an aspect of the present invention comprises a support for supporting the substrate 11, wherein the substrate 11 comprises the deposited material 23 as described above. The support may be any form of supporting means, for example a frame or table on which the substrate 11 can be held in place. The apparatus comprises a laser 12 for generating a laser beam, and directing means configured to direct the laser beam to move along said path in a direction of movement to irradiate the deposited material 23 to irradiate the deposited material 23 to form a conductive track along said path. The directing means may comprise the beam expander 13, any number of mirrors, e.g. the first mirror 14 and the second mirror 15, the galvanometer scanner 16 and/or the controller 17 described above. The substrate 11 may be mounted on a substrate support 18 (e.g. a chuck, for example on XY stages). Relative motion of the beam with respect to the substrate 11 may be due to the galvanometer scanner 16 and/or the substrate support 18.

FIGS. 2a-2f show examples of deposited material on the surface 21 of the substrate 11. The shape and thickness of the deposited material 23 on the surface 21 of the substrate in cross-section is not limiting. These figures only show examples and there are many different ways in which the shape of the deposited material when viewed in cross-section through the substrate can be varied. The thickness may vary in a variety of ways, however, ideally, the thickness of the deposited material 23, and any variation thereof, is known.

Figure 2A:
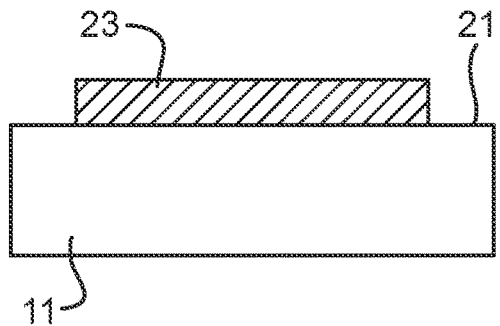
FIGS. 2a, 2b and 2c show cross-sectional views of a substantially flat surface of a substrate having deposited material on the surface which may be irradiated to provide a conductive track in accordance with the present invention.
Figure 2B:
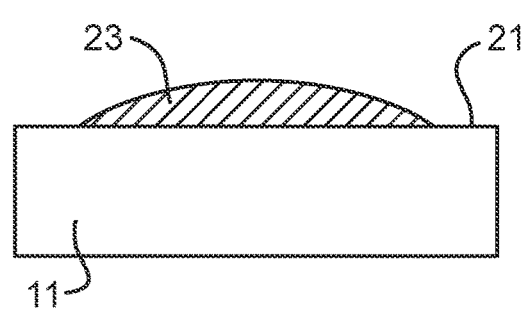
Figure 2C:
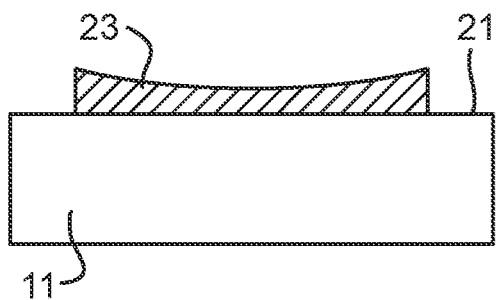

As depicted in FIG. 2a, the deposited material may be positioned substantially uniformly on top of the surface 21 of the substrate 11. In other words, the deposited material 23 may have a uniform thickness, e.g. having a thickness with a variation of less than approximately 10% of the thickness of the deposited material 23. In this example, the surface 21 of the substrate 11 is substantially flat. The thickness of the deposited material may vary in cross-section, for example as depicted in FIG. 2b or FIG. 2c. In FIG. 2b the deposited material 23 has a maximum thickness approximately in the centre, and minimum thicknesses at edges of the deposited material 23. In other words, the thickness varies across the width of the deposited material 23 varies from a minimum, to a maximum and back to a minimum. In FIG. 2c, the deposited material 23 is thicker at the edges of the deposited material 23 and has reduced thickness (which may or may not be substantially flat) between the thicker portions. The width of the deposited material is the width of the path when viewed in cross-section through the substrate 11 (as in FIGS. 2a-2f). The thickness of the deposited material 23 may vary along the path on the surface 21 of the substrate 11.

Figure 2D:
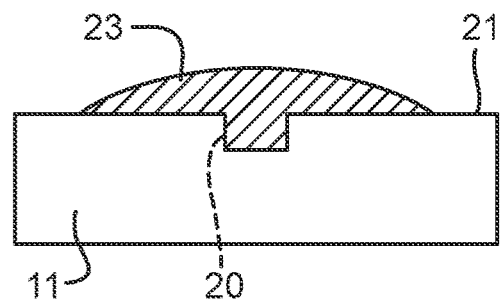
FIGS. 2d, 2e and 2f show cross-sectional views of a surface of a substrate comprising a groove, having deposited material on the surface which may be irradiated to provide a conductive track in accordance with the present invention.
Figure 2E:
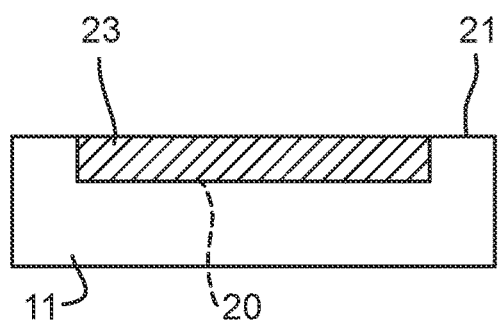
Figure 2F:
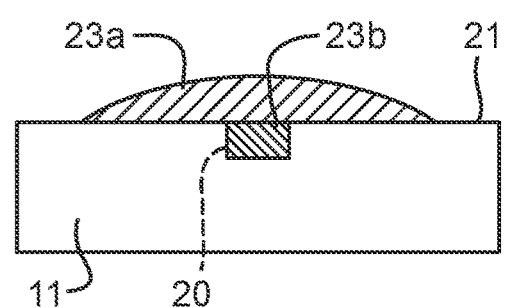

As depicted in FIGS. 2d, 2e and 2f, the surface 21 of substrate 11 may optionally comprise a groove 20. The deposited material 23 may also be located in the groove 20. FIG. 2d shows the deposited material of FIG. 2b, wherein the surface 21 comprises a groove 20. As depicted in FIG. 2d, the thickness of the deposited material 23 may be greater in the groove section. In FIG. 2d the deposited material 23 is depicted as being positioned on the surface 21 of the substrate 11 with the groove 20 being centrally located in cross-section, however, this is not necessarily the case. In FIG. 2e, the deposited material 23 is located on the surface of the substrate 21 entirely within the groove 20. As shown in FIG. 2e, the deposited material 23 may optionally be substantially level with a top surface of the substrate 11. The top surface may be the uppermost part of the surface 21 of the substrate 11.

In any of the above embodiments, the deposited material 23 may comprise at least two different materials. For example, the deposited material 23 may be formed with a first deposited material 23a and a second deposited material 23b. In an embodiment, either the first deposited material 23a or the second material 23b may be the same material as the deposited material 23. In an embodiment, the first material 23a may be located on the top surface of the substrate, as depicted in FIG. 2f. In FIG. 2f, the surface 21 comprises a groove 20. In an embodiment, the second deposited material 23b may be deposited substantially within the groove 20 as depicted in FIG. 2f (although, the location of the second deposited material 23b is not limited to this location). The second deposited material 23b being different from the deposited material 23a and the material used for the substrate 11. In an embodiment, the second deposited material 23b may be deposited in the groove 20 and may be cured, for example using a UV lamp, UV laser or an IR laser. The second deposited material 23b may comprise an inorganic based insulator or a polymer, for example a polymer with inorganic fillers. The first deposited material 23a may be deposited over the top of the substrate 11 and the second deposited material 23b. The first deposited material 23a may then be irradiated to provide a conductive track as described in any other embodiment.

Figure 3A:
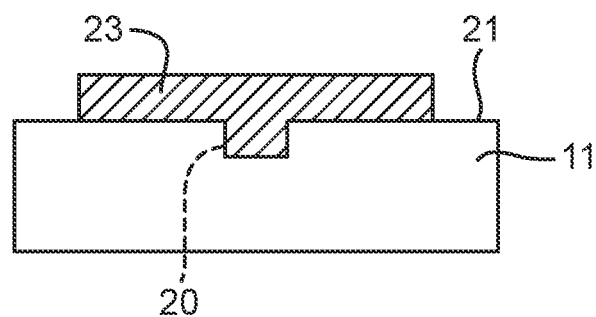
FIGS. 3a and 3b show a cross-sectional view and plan view, respectively, of a substrate having deposited particles along a surface thereon which may be irradiated to provide a conductive track in accordance with the present invention.
Figure 3B:
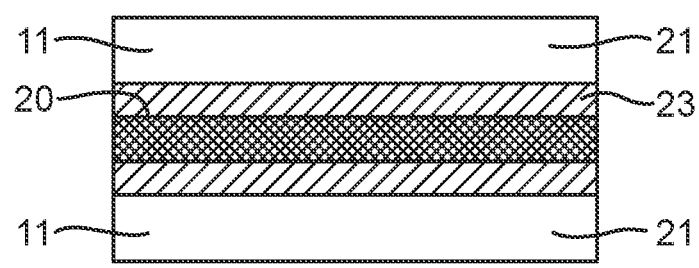

FIG. 3a depicts an example of a cross-section of the substrate similar to FIG. 2a, but wherein the surface 21 comprises a groove 20, as in FIG. 2d. The deposited material 23 is on the surface 21 of the substrate, in the groove 20 and adjacent to the groove 20, i.e. on the top surface of the substrate 11 and the groove 20. Therefore, the deposited material 23 has a different thickness when viewed in a cross-section of the substrate 11 (as was shown in FIG. 2d). The material 23 is deposited along a path on the surface 21 of the substrate 11 as depicted in FIG. 3b in plan view. In FIG. 3b cross-hatching is used for the central portion of the path, indicating an increased thickness which corresponds to the deposited material 23 of FIG. 3a in the groove 20. The deposited material 23 either side of the groove is shown in FIG. 3b with hatching, which corresponds to the deposited material of FIG. 3a which has a smaller thickness either side of the groove 20.

The thickness of the deposited material 23 may vary across the width of the path on the surface 21 of the substrate 11, as shown in the examples of FIGS. 2b, 2c, 3a and 3b. Alternatively or additionally, whether or not the thickness is uniform across the width of the path, the thickness of the deposited material 23 may vary along the path, i.e. as the laser beam travels along the path the thickness of the deposited material 23 being irradiated may vary. In other words the shape of the deposited material 23 in a cross-section through the substrate may vary along the path. For example, in one section, the deposited material 23/substrate 11 may have a cross-section similar to FIG. 2b, however, in another section, the deposited material 23/substrate 11 may have a cross-section similar to FIG. 2c.

Alternatively or additionally, there may be other variations along the path, for example, the width of the path, the width of the groove 20, the depth of the groove 20, the material(s) used to form the surface 21 of the substrate 11, the material(s) used for underlying layers of the substrate 11 and/or the deposited material 23 forming the path. In an embodiment, the groove may be the entire way through the substrate 11, i.e. the depth of the groove 20 may be the same as the thickness of the substrate 11 at the location of the groove 20 and the groove 20 may form an aperture through the substrate 11.

In the present invention, the deposited material 23 is irradiated to provide a conductive track, for example, to form part of an electrical circuit. When the deposited material 23 is irradiated, the laser beam is incident on the deposited material 23. The effect of the laser beam irradiating the deposited material will depend on the specific deposited material 23 used. The deposited material 23 may be any material which can be irradiated to form the conductive track and is not limited to the materials described herein.

In an embodiment, the deposited material 23 comprises particles, for example, held in a matrix. The deposited material 23 is irradiated by the laser beam to modify the interaction between the particles so that they provide a conductive track. Particles may be provided in the deposited material 23 with a coating which prevents the particles from oxidising. The deposited material 23 is heated using the laser beam to burn off the coating around the particles. The temperature required to burn off the coating around the particles may be higher than the temperature required to melt the deposited material 23. After the coating is burned off the particles, the deposited material 23 is further irradiated by the laser beam. When the deposited material 23 reaches a given temperature it softens or melts such that the interaction between the particles is altered so as to improve the physical contact therebetween, eg the deposited material is sintered, and hence the electrical contact between the particles, so that when the deposited material 23 solidifies it forms a conductive track.

In this embodiment, the particles may be nanoparticles. The particles may be metal particles. Preferably, the metal particles comprise silver, gold, nickel, aluminium and/or copper, although silver and/or copper are preferred. In particular, the metal particles may be metal microparticles and/or metal nanoparticles. In an embodiment the particles are held in a form of matrix. The matrix may be a fluid for example, the matrix may be a paste or ink containing the particles. The matrix may be an organic solvent or a combination of organic solvents, for example, the matrix may comprise ethanol and/or ethylene glycol.

In an embodiment, the deposited material 23 comprises organometallics. For example, the deposited material 23 may be an organic compound derived from silver salt, e.g. silver nitrate. For example, the deposited material 23 may comprise silverneodecanoate. The laser beam may be used to irradiate the deposited material 23 in the same way as described above, however, the effect of the irradiation may be different to the effect described above. The irradiation may heat the organometallic material, which may cause a precipitation reaction causing the deposited material to form the conductive track.

The method comprises the step of generating a laser beam, for example using a laser 12 as depicted in FIG. 1. It is preferable for the laser beam to move as fast as possible whilst accurately irradiating the path. There are several benefits of moving the laser beam at higher speeds. Increasing the speed of the laser beam increases the speed of forming the conductive tracks and can therefore, increase the speed of manufacturing the substrates with the conductive tracks formed thereon. Furthermore, irradiating a particular spot or portion of the deposited material 23 for too long may lead to thermal damage of surrounding areas on the surface 21 of the substrate 11 and/or underlying layers of the substrate 11. In other words, the laser beam may heat up not only the deposited material 23, but the substrate 11 as well, which may damage the substrate 11. Increasing the speed of the laser beam may thus reduce the risk of such thermal damage particularly if the laser beam is incident upon areas of the substrate 11 beyond the path of deposited material 23.

For at least the reasons given above, it is desirable to move the laser beam as quickly as possible along the path, whilst ensuring that the deposited material 23 is irradiated for long enough to form a conductive track. As such the laser beam may be configured to move along the path at a speed of approximately greater than 5 m/s. However, the laser beam may be slower to ensure that the conductive track is effectively formed. The laser beam may, for example, be configured to move along the path at a speed of up to approximately 5 m/s. More preferably, the laser beam is configured to move at a speed in the range 0.1 m/s to 5 m/s, and more preferably in the range 1 m/s to 4 m/s.

In order to improve the efficiency, it is beneficial to irradiate the material as quickly as possible to form the conductive tracks, however, increasing the speed requires additional control. As such, it is beneficial to provide a laser beam in a manner such that it can more accurately be directed at the deposited material 23, whilst ideally avoiding the surrounding areas of the substrate so as to irradiate effectively only the deposited material 23.

As described above, the deposited material 23 may vary across the width of the path in cross-section and/or along the length of the path in at least one way. As such, the amount of energy required to irradiate the deposited material 23 depends on which part of the path is being irradiated. In other words, the amount of energy per area, i.e. the dose of energy, needed on any particular part of the path may vary.

The laser beam of the present invention has an optical axis and an energy distribution within a cross-sectional area of the laser beam incident on the surface 21, the energy distribution being non-circularly symmetric about the optical axis at the surface 21. The energy distribution being non-circularly symmetric may include but is not limited to the energy distribution having no symmetry at all. The method comprises directing the laser beam such that it is incident on the deposited material 23 on the surface 21 of the substrate 11. The apparatus comprises directing means described above for directing the laser beam to the deposited material 23 on the surface 21 of the substrate 11. The laser beam is directed to move along the path on the surface 21 of the substrate 11 to irradiate the deposited material 23 to provide a conductive track along said path. A selected orientation of the energy distribution within the cross-sectional area is aligned with the direction of movement of the laser beam.

Having a non-circularly symmetric energy distribution within the cross-section of the laser beam incident on the deposited material 23 on the substrate 11 means that the amount of energy provided within the cross-sectional area of the laser beam to any given spot on the path within a given time will not be circularly symmetric. As such, the orientation of the energy distribution can be selected to control the irradiation of the path, e.g. to provide the required or desired degree of irradiation to the deposited material 23, whilst minimizing the risk of causing thermal damage to other parts of the substrate 11.

Having a non-circularly symmetric energy distribution allows the laser beam to concentrate energy in areas where it is required or desired whilst reducing energy in other areas, e.g. where it may cause damage. The orientation is selected to control the dose of energy provided to the area of the path beneath the laser beam. For example, at a selected orientation, the energy distribution within the cross-section incident on the surface 21 may have reduced intensity at the sides of the cross-section which correspond to the edges of the path when viewed in cross-section through the substrate 11. As such, the orientation may be selected to provide reduced irradiation at the edge, for example, if there is a reduced thickness at the edge of the path, as depicted in FIG. 2b. The energy distribution within the cross-section incident on the surface may be an arbitrary distribution. The energy distribution within the cross-section incident on the surface may be specifically tailored, i.e. having a selected intensity profile within the cross-section. Alternatively or additionally, the shape of the cross-section may be selected and varied.

The laser beam of the present invention has a selected energy distribution within a cross-sectional area of the laser beam incident on the surface which is non-circularly symmetric about the optical axis of the laser beam. This energy distribution may be due the way in which the laser beam is generated, i.e. the asymmetry may be formed by the laser 12 itself. Alternatively or additionally, the laser 12 may produce a first laser beam which has a substantially circularly symmetric energy distribution about the optical axis. However, the method may comprise the further step of modifying the first laser beam produced by the laser 12 to provide a second laser beam, which is a modified laser beam. The second laser beam is modified so that the energy distribution within a cross-sectional area of the laser beam incident on the surface is non-circularly symmetric about the optical axis at the surface. The apparatus may comprise modifying means to modify the laser beam so that the energy distribution of the first beam the energy distribution of the second beam are different from each other.

The step of modifying the laser beam may, for example, comprise passing the first laser beam through a non-circular aperture. The laser beam may also be modified to have a different cross-sectional shape or varied energy distribution in cross-section by passing the laser beam through a mask, not shown in FIG. 1. The mask may have a non-circular aperture. The mask may be any apparatus which can be used to pattern, imprint, or alter the shape of the imprint of the laser beam. Alternatively, a reflective mask may be used in the same way to modify the cross-sectional shape or energy distribution in cross-section of the laser beam, but by reflecting an incoming laser beam, rather than allowing the laser beam to pass through it.

The laser beam may be modified using any device, transmissive or reflective, configured to shape and/or direct the laser beam, e.g. a diffractive optical element, a spatial light modulator and/or a digital micro-mirror. Any of these devices may be used to tailor the laser in a cross-section of the laser beam i.e. modify the energy distribution at the laser focus. Any of these devices may be used instead of, or in addition to, the components depicted in FIG. 1. In an embodiment, the first and/or second mirror may be replaced with a diffractive optical element, a spatial light modulator or a digital micro-mirror. Additionally or alternatively, the first and/or second mirror may be controlled by the controller 17 to control the direction of the laser beam reflected by the first and/or second mirror respectively.

Preferably, the width of the laser beam cross-section incident on the surface 21 of the substrate 11 is arranged to correspond substantially with the width of said path. In other words, the width of the laser beam may be the same as the path. Preferably, the width of the laser beam is in the range of approximately 10 µm to 10 mm, or more preferably in the range of approximately 100 µm to 1 mm. Ideally, the width of the laser beam (and the path) is as small as possible whilst reliably forming conductive tracks.

If the width of the cross-section of the laser beam corresponds to the width of the path, this ensures that all of the deposited material 23 across the width of the path will be irradiated. Furthermore, this reduces or avoids the possibility of the laser beam being incident on the substrate adjacent the path. This is beneficial in that the laser does not irradiate the adjacent surface of the substrate and therefore, is likely to reduce thermal damage to the substrate on portions of the substrate not including the path.

The width of the laser beam may be altered, for example, by a mask. Thus, the cross-section of the laser may be truncated. The width of the laser beam orthogonal to the direction of the movement may typically be truncated. The width of the laser beam cross-section may be truncated symmetrically on either side. The width of the laser beam may be modified using optical elements to alter the width of the laser beam.

The modifying means of the apparatus may comprise the mask, the reflective mask, and/or any optical elements used to modify the laser beam, e.g. by altering the shape of the cross-section of the laser beam incident on the surface and/or the energy distribution within the cross-section. The modifying means may optically distort the laser beam to reduce or expand the beam, for example, using a beam expander. The apparatus may be configured such that the modifying means, e.g. the mask, is imaged onto the substrate.

Additionally, material may be deposited on the surface of the substrate, beyond the desired location of the path. The deposited material 23 not forming part of the desired path may be referred to as additional material. If the laser beam irradiates the areas surrounding the deposited material 23 on the path, some of the additional material may also be irradiated, thus forming additional (undesired) conductive portions. Such additional conductive portions may reduce the quality of the electrical connections formed by the conductive tracks. Therefore, reducing the likelihood (e.g. by controlling the width of the cross-section of the laser beam incident on the surface of the substrate) of the laser irradiating portions of the substrate other than the desired path improves the quality of the conductive tracks forms.

As mentioned, the deposited material 23 and/or the substrate may vary along the length of the path which may make it more difficult to ensure that the deposited material 23 receives the appropriate amount of radiation to form a conductive track without causing thermal damage in other areas. As such, selecting the orientation of the energy distribution of the laser beam and rotating the shape of the cross-section of the laser beam incident on the surface 21 of the substrate 11, or the energy distribution within it, allows the amount of radiation to be varied as desired or required to irradiate the deposited material 23 to form the conductive track.

The energy distribution of the laser beam in the cross-section incident on the surface may be selected to provide a tailored spot. This may mean that the shape of the cross-section is selected and/or the energy distribution within the cross-section is selected. Variations of possible tailored spots are described in the embodiments below as depicted in FIGS. 4-7.

Figure 4A:
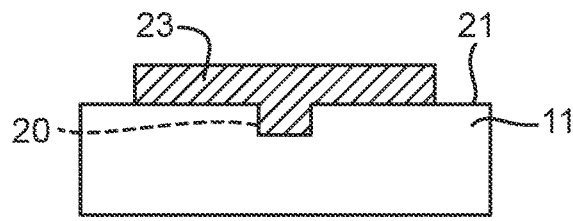
FIGS. 4a, 4b show the deposited material and substrate of FIGS. 3a and 3b.
Figure 4C:
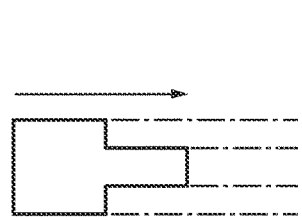
FIG. 4c shows an exemplary plan view of a cross-section of the laser beam used in the invention incident on the deposited material on the surface of the substrate.
Figure 4B:
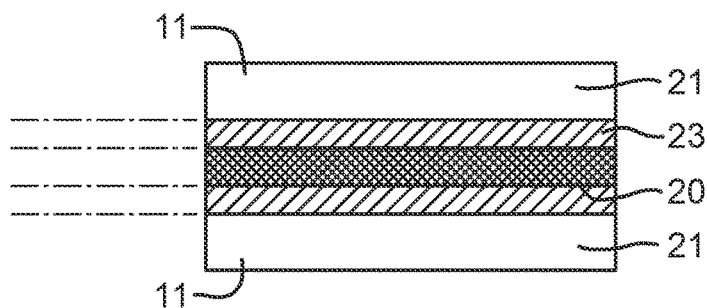

FIGS. 4a, 4b and 4c illustrate an example of how the cross-sectional shape of the laser beam incident on the surface 21 of the substrate 11 may be matched to the deposited material 23 on the substrate 11 shown in FIGS. 3a and 3b. FIGS. 4a and 4b correspond to FIGS. 3a and 3b respectively. As previously described, the thickness of the deposited material 23 as shown in FIG. 4a varies due to the groove 20 in the surface 21 of the substrate 11. Therefore, the deposited material 23 is thicker in a central portion along the path. As shown in plan view, in FIG. 4b, the deposited material 23 has a substantially uniform width along the length of the path.

FIG. 4c depicts the shape of the energy distribution in a cross-section of the laser beam at the surface 21 of the substrate 11. In an embodiment the radiation intensity may be uniform within the cross-sectional shape, however, the shape itself may be non-circularly symmetric about the optical axis as shown. As depicted in FIG. 4c, in this example, the energy distribution of the laser beam has a central part aligned with the thicker portion of the deposited material 23 of the path. This central part being longer in the direction of movement than the side parts of the energy distribution which are aligned with the thinner portions of the deposited material 23. The direction of movement of the laser beam is depicted by the arrow. The laser beam thus irradiates the central (thicker) portion for a greater period of time than the side (thinner) portions as the laser beam is moved along the path. This enables all parts of the deposited material 23 to receive the appropriate (or desired) amount of radiation.

If such a profile was not used, moving the laser beam at the required speed to irradiate the side (thinner) portions of the deposited material 23 would likely mean that the central portion was not fully irradiated. This would lead to a poor quality conductive track in the central groove 20. Alternatively, if the laser was moved more slowly so the central portion received additional radiation this would reduce the speed and the efficiency of forming the conductive tracks. The additional radiation may also damage the deposited material 23 and/or the substrate beneath the deposited material 23 adjacent the groove 20. Thus, the laser beam profile is selected according to the width and/or thickness of the deposited material 23 on the path so that all deposited material 23 receives an appropriate dose of radiation whilst minimising risk of thermal damage.

Figure 5A:
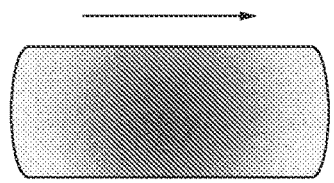
FIG. 5a is a plan view schematically showing the laser intensity incident upon the substrate by virtue of shading and 5b and 5c show profiles of the laser intensity, viewed from a primary and secondary axis, respectively, of a laser beam used in the invention.

In a preferred embodiment, the intensity of the energy distribution of the cross-section of the laser beam incident on the surface of the substrate 11 is as depicted in FIG. 5a. FIG. 5a depicts the radiation intensity variation of the laser beam incident upon the surface of the substrate 11. The outline of the cross-section of the laser beam incident on the surface 21 is depicted in FIG. 5a. The outline corresponds to the shape of the cross-section of the laser beam. The direction of the movement of the laser beam is depicted by the arrow. FIG. 5c depicts the variation of intensity in a primary axis, i.e. a central axis through the cross-section of the beam incident on the surface 21 of the substrate 11. The primary axis may be orthogonal to the optical axis. As depicted in FIG. 5c, the variation of intensity of the energy distribution in a primary axis (X) has a substantially Gaussian profile.

Figure 5B:
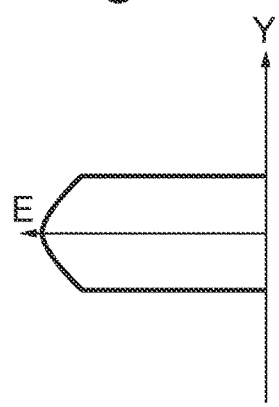
Figure 5C:
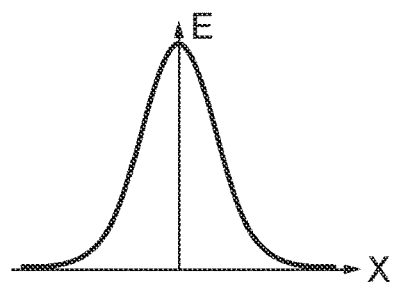

FIG. 5b depicts the beam profile viewed in a secondary axis (Y), the secondary axis being orthogonal to the primary axis. The primary axis may be aligned with the direction of movement of the laser beam such that the secondary axis corresponds to the width of the laser beam. As shown in FIG. 5b, the variation of intensity of the laser beam across the width of the laser beam is a truncated Gaussian profile in this embodiment. The Gaussian profile has a radiation peak in the centre, i.e. at the optical axis, and the radiation intensity reduces on either side of this.

This radiation intensity in the secondary axis is a Gaussian profile truncated symmetrically on either side of the optical axis. The profile may be truncated to avoid the laser beam irradiating the substrate 11 or any additional deposited material 23 outside of the path. This can be advantageous, because the path is likely to have defined edges, and the second beam profile may be truncated to more accurately match the edges of the path such that the width of the cross-section of the laser beam incident on the path is substantially the same as the path.

The variation in intensity along the primary axis is depicted in FIG. 5c. In this embodiment, this profile is a Gaussian profile which is symmetrical about the optical axis. The Gaussian profile has a peak at the centre of the cross-section along the primary axis and decreases on either side to a leading edge of the laser beam and a trailing edge of the laser beam. The leading edge is the front edge of the laser beam when moving in the direction of the movement, otherwise referred to as the scanning direction. The trailing edge is the back edge of the laser beam when moving in the scanning direction.

Using an energy distribution with a reduced intensity at the leading edge allows the deposited material to be heated slowly which can reduce or prevent damage to the deposited material. Damage can occur when the materials are heated too quickly. In some situations reduced intensity at the leading edge can be beneficial, for example, to remove solvents at the lower temperature before the remaining deposited material is irradiated at the higher temperature.

As can be seen in FIG. 5a, the energy distribution described above has a roughly centrally located peak of intensity, a specific width, and gradual variation in the intensity from the central point to the leading and trailing edges of the cross-section.

Figure 6A:
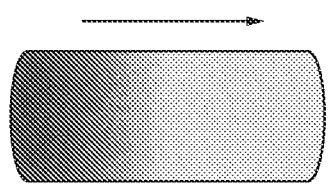
FIG. 6a is a plan view schematically showing the laser intensity incident upon the substrate by virtue of shading and 6b and 6c show profiles of the laser intensity, viewed from a primary and secondary axis, respectively, of a laser beam used in the invention.

In a preferred embodiment, the laser beam may be altered to have a peak radiation intensity at a trailing edge of the cross-section of the laser beam incident on the surface 21 of the substrate 11, as depicted in FIG. 6a. The direction of movement of the laser beam is depicted by the arrow.

Figure 6B:
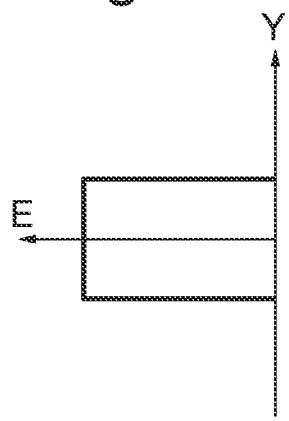

As depicted in FIG. 6b, the beam intensity in the secondary axis has a substantially top-hat profile. In other words, the radiation distribution is substantially uniform across the width of the path. Using this type of distribution of the laser is advantageous because as long as the laser beam is accurately positioned and the width of the laser beam substantially corresponds to the width of the path, the likelihood of irradiating excess material or surrounding substrate 11 adjacent to the path is reduced. Furthermore, having uniform radiation across the path may be particularly useful when the deposited material 23 is uniform in thickness on the surface of the substrate (for example in FIG. 2a or 2d). Providing a laser beam with an energy distribution which is constant across the path width (i.e. is a top-hat) allows the laser beam to irradiate the path more uniformly across the width of the path than using other profiles, for example using a Gaussian profile.

Figure 6C:
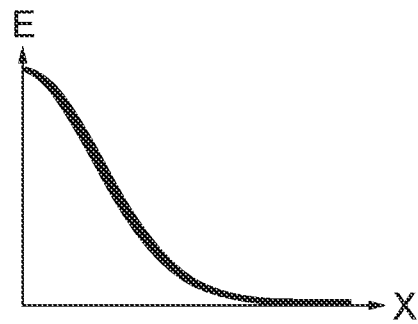

The intensity variation of the energy distribution of the laser beam within the cross-section incident on the surface 21 may be a ramped profile in the primary axis as shown in FIG. 6c. The ramp profile starts from a minimum value at the leading edge and increases gradually to a maximum value at the trailing edge. As depicted in FIG. 6c, the gradient of the ramp may not be linear. As depicted in FIG. 6c, the ramp profile may be substantially equivalent to half the Gaussian distribution. The ramp profile may be beneficial because a lower temperature is provided at the leading edge, followed by a higher temperature as the laser beam moves along the path. In some situations this can be beneficial, for example, to remove solvents at the lower temperature before the remaining deposited material is irradiated at the higher temperature. A reverse ramp profile may also be used, the reverse ramp profile being the opposite of the ramp profile in that it starts from a maximum value at the leading edge and decreases gradually to a maximum value at the trailing edge.

Figure 7A:
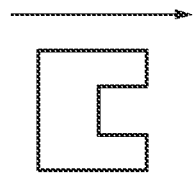
FIG. 7a is a plan view schematically showing the shape of the laser beam incident upon the substrate and 7b shows the profile of the dose of laser energy incident on the substrate as the beam is moved relative to the substrate.
Figure 7B:
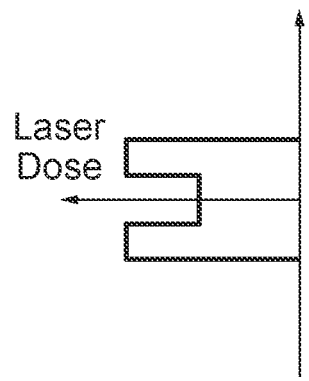

In a further embodiment, the intensity of the energy distribution may be uniform within the cross-sectional shape in that the intensity is not varied within the cross-sectional shape along the primary or secondary axis as described in relation to FIG. 4c and as shown in FIG. 7a. A cross-section with a uniform energy distribution intensity wherein the cross-section is depicted in FIG. 7a. The direction of the movement of the laser beam is depicted by the arrow. FIG. 7b depicts the profile of the dose of laser energy incident upon the substrate 11 as the beam is moved relative to the substrate 11. The dose of the laser energy incident upon the substrate 11 is the integral of the energy distribution incident upon the substrate 11 as the laser beam is moved relative to the substrate 11.

A further exemplary intensity variation may include an M-shaped profile, which has a peak intensity on either side and a low-point of intensity at the centre and ring-shaped profiles, which may vary in diameter and may be truncated. Any variation of the above examples may be used depending on the required/desired intensity distribution required/desired to irradiate the deposited material 23. The energy distribution may be provided having a radiation as described in any of the above embodiments in the primary or secondary axis. The energy distribution may be selected to match most effectively the width and thickness of the path of deposited material 23 in order to form efficiently the conductive track. The laser beam energy distribution may be selected to account for the variation in thickness and/or width in the deposited material 23 forming the path, variation in material(s) forming the surface 21 or underlayer of the substrate and/or to account for variation in the deposited material used. The energy distribution of the laser beam may be changed at any time, including during use. For example, the energy distribution may be changed to most effectively match any variation described above. Matching the characteristics of the laser beam cross-section and radiation intensity with the thickness and/or width of the path and/or the material(s) of the deposited material 23 and/or substrate 11 in this way is beneficial in more efficiently irradiating the deposited material 23 and providing higher quality conductive tracks as described above whilst at the same time minimising heat damage to surrounding areas or underlying layers.

Figure 8:
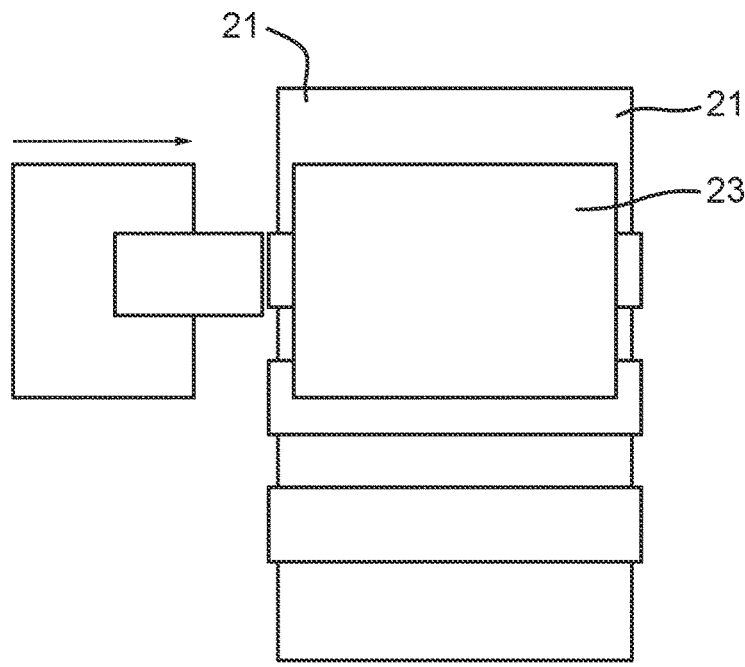
FIG. 8 shows a laser beam according to an embodiment of the invention applied to deposited material on the surface of a substrate.

FIG. 8 is a plan view of an electrical interconnector, e.g. between adjacent cells of a thin film device such as a photovoltaic panel. Such an interconnector is described in WO 2011/048352. The method described herein may be used to form the conductive track which electrically connects upper and lower electrode layers of the device as is shown in FIG. 8. FIG. 8 depicts a further example of a tailored laser spot being directed to the deposited material 23. The direction of movement of the laser beam is depicted by the arrow. The tailored spot of FIG. 8 is similar to the energy distribution shown in FIGS. 4c and 7a-b in that the energy distribution within the cross-section may be uniform. The laser beam incident on the surface 21 of the substrate 11 has a specific cross-sectional shape to efficiently provide the amount of radiation required for different portions for the deposited material 23.

The selected orientation of the energy distribution of the laser beam in any of the above embodiments may be elongated in the direction of movement, i.e. the scanning direction. Alternatively or additionally, the energy distribution may be symmetric about the direction of movement, as depicted in any of FIGS. 4 to 8.

As in any of the examples described above, the deposited material 23 may not be provided uniformly along the path. For example, a part of the path may have portions which have a thicker layer of deposited material 23, whereas other parts of the path may be thinner. Additionally, a portion of the path may have uniform cross-sectional thickness, whereas other parts of the path may be have a cross-section which has deposited material 23 partially within a groove, or non-uniformly distributed on the top surface of the substrate. In other words, the cross-section thickness may vary along the path.

In a preferred embodiment of the present invention, the energy distribution profiles can be altered whilst irradiating the deposited material 23 to alter the cross-sectional shape of the laser beam and/or alter the intensity of the radiation within the cross-sectional shape to more closely match the radiation distribution required to irradiate efficiently the deposited material 23. The energy distribution within the laser spot (i.e. within the cross-sectional shape) can thus be altered dynamically as the laser spot is moved along the path. Alternatively or additionally, the shape of the cross-section itself can thus be altered dynamically as the laser spot is moved along the path. This is advantageous in that it means that the deposited material 23 can be more accurately irradiated to ensure that all of the deposited material 23 on the path is irradiated, and reduces the likelihood of irradiating any additional deposited material 23 outside of the path, or the surrounding substrate. The first and/or second beam profiles may be altered using the modifying step in any of the embodiments described above.

The method according to an aspect of the invention comprises moving the laser beam along said path with a selected orientation aligned with the direction of movement. This means that the selected orientation is aligned with the direction of movement along at least a portion of the path. The selected orientation may be aligned with the direction of movement for only a short period. Alternatively, the selected orientation may be aligned with the direction of movement for longer periods as the laser beam moves along the path, or may be aligned for substantially the entire length of the path.

In order to maintain the alignment between the selected orientation and the direction of movement, the energy distribution of the laser beam is rotated about the optical axis. As the laser beam is rotated to alter the alignment, the cross-section of the laser beam incident on the deposited material 23 may more closely matches the width of the deposited material 23 incident with the laser beam. As the laser beam is rotated to alter the alignment, that the radiation distribution in the cross-section may more closely match the radiation required depending on the thickness of the deposited material 23 to be irradiated.

The laser beam may be rotated in a number of different ways. The cross-sectional shape of the laser beam may be rotated and/or the energy distribution within the shape may be rotated. For example, the controller 17 may be used to alter the position or reflectivity of the first mirror 14, which may be a digital mirror device, to rotate the shape of the cross-section of the laser beam incident upon the substrate. The digital mirror device may comprise a plurality of small mirrors forming an array of mirrors, wherein each mirror is individually controlled to deflect at least a part of the laser beam. The plurality of mirrors can be used to control the reflection of the laser beam, and thus the energy distribution within the cross-section of the laser beam. The controller 17 may optionally be used to control each of the mirrors used in the digital mirror device.

Figure 9:
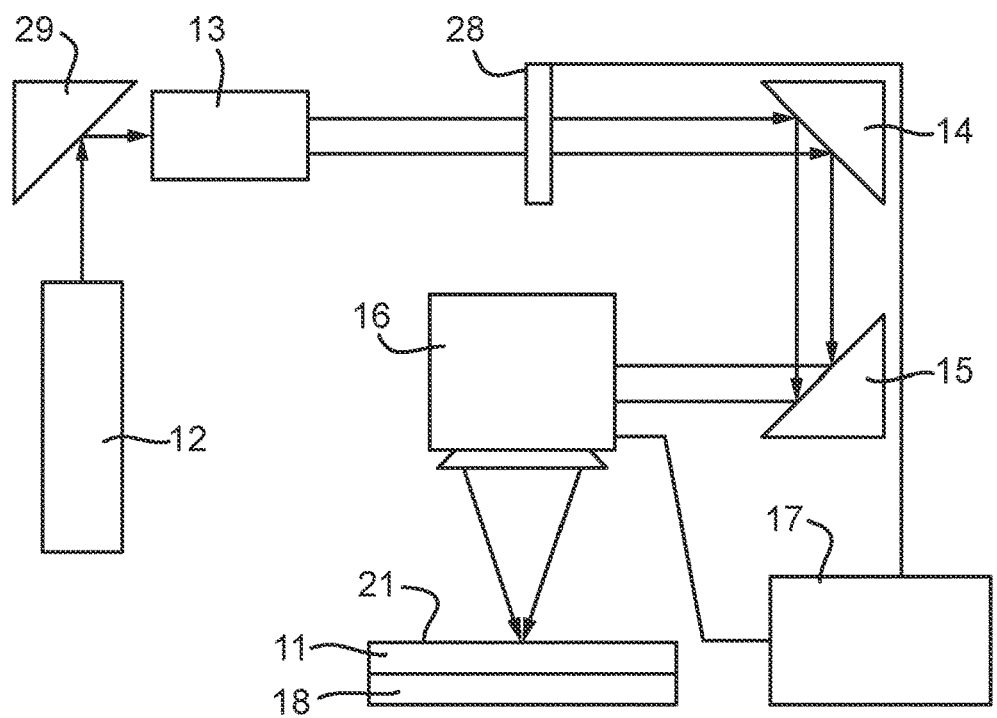
FIG. 9 shows another exemplary apparatus according to an aspect of the invention for carrying out the method as described in relation to a further aspect.

The method may further comprise passing the laser beam through a mask, for example using the apparatus depicted in FIG. 9. The mask 28 depicted in FIG. 9 is used to shape the laser beam. The mask 28 may comprise an aperture. The mask 28 may also be controlled by the controller 13 and may be rotated to alter the orientation of the laser beam relative to the substrate. Such a mask may be used in addition to or instead of the digital mirror device shown in FIG. 1.

Alternatively or additionally, a spatial light modulator may be used to alter and/or rotate the laser beam shape instead of or in addition to the digital mirror device and/or the mask. Alternatively or additionally, a dove prism may be used. The spatial light modulator, digital mirror device, dove prism and/or the mask may each be part of the apparatus and may be controlled by the controller 17.

Rotating the laser beam on the substrate means that the laser beam can be more accurately controlled as it irradiates the deposited material 23 on the surface of the substrate. As such, the laser beam is less likely to irradiate the surface of the substrate which does not comprise deposited material 23 along the path which has the advantages described above. The laser beam may be rotated during use, i.e. when being directed at the deposited material 23, to align of the laser beam and the path.

The laser beam is directed to move along the path of deposited material 23 on the surface of the substrate. The path on the surface of the substrate may comprise straight portions extending in different directions and/or curved portions. For example, the path on which the conductive track is formed may be part of an intricate pattern used to form narrow electrical connections e.g. along the edge of a touch panel or around one or more corners of the touch panel. The laser beam is rotated as described above such that the selected orientation of the laser beam is substantially aligned with the path when the laser beam is moving along straight sections and around curved sections of the path. The curved section may be a corner between two straight lines. In this way, the cross-section of the energy distribution of the laser beam may be rotated (or steered) as the laser beam moves along the straight and cornered portions sections of the path to maintain alignment of the cross-sectional shape of the laser beam incident on the path with the profile of the deposited material 23 being irradiated.

The laser beam may be moved along a first part of the path, rotated as required and/or the energy distribution thereof altered as required, and then moved along a second part of the path.

As mentioned above, the path may comprise a groove 20 formed in the surface 21 of the substrate 11. The substrate 11 may be provided with a groove 20 already formed. Alternatively, the method may further comprise the step of forming a groove 20 in the surface 21 of the substrate 11. The groove 20 may be formed by known methods. For example, the groove 20 may be formed by removing a top portion of the substrate 11 along the path e.g. by laser ablation. Alternatively, the groove 20 may be formed by the addition of a further layer on top of the substrate whilst leaving some portions of the substrate without the additional layer, thus providing a groove 20 due to the lack of the additional layer in some areas. The apparatus may comprise groove-forming means, for example, the means for providing the further layer and/or a further laser for cutting grooves in a surface 21 of the substrate 11.

The method may comprise providing a substrate 11 already comprising deposited material 23. The method may further comprise a step of depositing material on the substrate. The method may comprise depositing material along the path on the substrate. Alternatively, the method may comprise depositing the material on the surface of the substrate, and removing additional deposited material which is not in the desired areas, i.e. not in the path. In an embodiment, the apparatus comprises depositing means to deposit the material on the substrate 11 along the path on the surface 21 of the substrate 11, using either of these methods. The step of depositing material may, for example, be carried out using nozzles which are configured to release droplets of material onto the surface 21 of the substrate 11 and/or a stream of material from one or more nozzles. As such, the apparatus may comprise nozzles and the apparatus may be, or may comprise, an ink jet printer comprising said nozzles. Alternatively, the depositing means may comprise at a screen printer. The material to be deposited in any of these embodiments may comprise particles, and the particles may optionally be held in a matrix.

As described above, the laser beam is directed to move along said path. This refers to the laser beam and the substrate 11 moving relative to each other. The movement may be a translation or rotation of the laser beam relative to the substrate 11. The substrate 11 may be controlled to move relative to a stationary laser beam. Alternatively, the laser beam may be controlled to move relative to a stationary substrate 11. Alternatively, the laser beam and the substrate may both be controlled to move to alter their position relative to one another.

The controller 17 in any of the above embodiments may be a single controller used to control multiple components of the apparatus. Alternatively, the controller may comprise several controller units, each controller unit being configured to control at least one component of the apparatus. The controller may comprise processing means, e.g. a microprocessor or a computer, adapted or programmed to provide the required control signals. In a preferred embodiment, the variation of the deposited material 23 and/or material(s) used for the substrate 11 are known and stored by a processor which is used as part of, or in conjunction with, the controller 17, for controlling the selected orientation and optional variation of the energy distribution of the laser beam as it is directed along the path.

In the present invention, the number of mirrors provided as part of the directing means is not limiting. For example, FIG. 1 depicts a first mirror 14 and a second mirror 15 and FIG. 9 depicts an additional mirror 29. However, the number of mirrors used to redirect the laser beam is not limiting and any appropriate number may be used. Additionally, the number of devices configured to direct and/or shape the beam is not limiting and any appropriate number may be used.

In any of the above embodiments, the laser beam may be moved along the path with the optical axis of the laser beam substantially perpendicular to the surface of the substrate. As such, the cross-section of the laser beam incident on the surface of the substrate may be the cross-section of the laser beam perpendicular to the optical axis.

An apparatus may be provided in accordance with the method in any of the above-described embodiments.

The invention claimed is:

1. A method for forming a conductive track on a surface of a substrate, the substrate comprising deposited materal along a path on a surface of the substrate wherein the path is formed in a predefined pattern on a top surface of the substrate, the path comprising straight portions extending in different directions and/or curved portions, the method comprising:
providing the substrate;
generating a laser beam having an optical axis and an energy distribution within a cross-sectional area of the laser beam incident on the surface, the energy distribution being non-circularly symmetric about the optical axis at the surface; and
directing the laser beam to move along said path to irradiate the deposited material to provide a conductive track along said path,
wherein the laser beam is arranged to follow the straight and/or curved portions of the path and wherein a selected orientation of the energy distribution within the cross-sectional area is aligned with the direction of movement of the laser beam and the energy distribution of the laser beam within the cross-sectional area is rotated about the optical axis relative to the substrate so as to maintain alignment between the selected orientation and the direction of movement.

2. The method according to claim 1, wherein the shape of the cross-sectional area incident on the surface, and/or the energy distribution of the laser beam within the cross-sectional area incident on the surface, is adapted according to the amount of irradiation it is desired that the deposited material under the cross-sectional area on the surface of the substrate receives as the beam moves along the path.

3. The method according to claim 1, wherein the energy distribution of the laser beam within the cross-sectional area is symmetric about the direction of movement.

4. The method according to any claim 1, wherein the selected orientation of the energy distribution of the laser beam within the cross-sectional area is elongated in the direction of movement of the laser beam.

5. The method according to claim 1, wherein the width of the cross-sectional area of the laser beam incident on the surface is arranged to correspond substantially with the width of said path.

6. The method according to claim 1, further comprising a step of modifying a first laser beam, which has a substantially circularly symmetric energy distribution about the optical axis, such that the energy distribution of the laser beam within the cross-sectional area incident on the surface is non-circularly symmetric about the optical axis.

7. The method according to claim 6, in which the first laser beam is modified by passing it through a non-circular aperture.

8. The method according to claim 1, further comprising a step of depositing the material on the substrate along the path on the surface of the substrate.

9. The method according to claim 1, wherein the cross-sectional area of the laser beam incident on the surface has a primary axis and a secondary axis, the primary axis being orthogonal to the secondary axis, wherein the variation of intensity of the energy distribution along the primary axis is a substantially Gaussian profile and the variation of intensity of the energy distribution in the secondary axis is a substantially Gaussian profile, wherein the orientation of the energy distribution is selected such that the primary axis is substantially aligned with the direction of movement and both sides of the Gaussian profile in the secondary axis are truncated so the width of the truncated profile corresponds substantially with the width of said path.

10. The method according to claim 1, wherein the cross-sectional area of the laser beam incident on the surface has a primary axis and a secondary axis, the primary axis being orthogonal to the secondary axis, wherein the variation of intensity of the energy distribution along the primary axis is a substantially ramped profile and the variation of intensity the energy distribution along the secondary axis is a substantially top-hat profile, wherein the orientation of the energy distribution is selected such that the primary axis is substantially aligned with the direction of movement and the width of the substantially top-hat profile is arranged to correspond substantially with the width of said path.

11. The method according to claim 1, wherein the deposited material comprises particles held in a matrix.

12. The method according to claim 11, wherein the particles are metal particles.

13. The method according to claim 1, wherein the deposited material has a thickness on the surface of the substrate which varies in cross-section through the substrate.

14. The method according to claim 13, wherein the path comprises a groove formed in the surface of the substrate in cross-section through the substrate.

15. The method according to claim 1, wherein the energy distribution within the cross-sectional area of the laser beam incident on the surface of the substrate is adapted according to the thickness of the deposited material so the thicker areas receive more radiation than the thinner areas.

16. The method according to claim 1, wherein the energy distribution within the cross-sectional area of the laser beam incident on the surface of the substrate is adapted according to the material from which the surface of the substrate and/or underlying layers of the substrate are formed.

17. An apparatus for forming a conductive track on a surface of a substrate, the substrate comprising deposited material along a path on a surface of the substrate wherein the path is formed in a predefined pattern on the surface of the substrate, the path comprising straight portions extending in different directions and/or curved portions, the apparatus comprising:

a support for supporting the substrate;

a laser beam source configured to provide a laser beam having an optical axis and an energy distribution within a cross-sectional area of the laser beam incident on the surface, the energy distribution being non-circularly symmetric about the optical axis at the surface; and directing means configured to direct the laser beam to move along said path to irradiate the deposited material to provide a conductive track along said path, wherein the laser beam is arranged to follow the straight and/or curved portions of the path, wherein a selected orientation of the energy distribution within the cross-sectional area is aligned with the direction of movement of the laser beam and the directin means are confiured to rotate the energy distribution of the laser beam within the cross-sectional area about the optical axis relative to the substrate so as to maintain alignment between the selected orientation and the direction of movement.

18. The apparatus according to claim 17, wherein the apparatus is arranged to adapt the shape of the cross-sectional area incident on the surface to be symmetric about the direction of movement.

19. The apparatus according to claim 17, wherein the directing means comprises a mask through which the laser beam passes, wherein the mask is arranged to rotate the energy distribution of the laser beam about the optical axis.

20. The apparatus according to claim 17, wherein the directing means comprises an optical element arranged to reflect the laser beam and the optical element is configured to rotate the energy distribution of the laser beam about the optical axis.

21. The apparatus according to claim 17, further comprising a depositing unit configured to deposit the material on the substrate along said path on the surface of the substrate.

22. The apparatus according to claim 21, wherein the depositing unit comprises nozzles in the ink jet printer to deposit the material, wherein the material comprises particles held in a matrix.

23. The apparatus according to claim 22, wherein said nozzles are part of an inkjet printer.

24. The apparatus according to claim 21, wherein the depositing unit comprises a screen printer, wherein the material comprises particles held in a matrix.

* * * * *